United States Patent
Freeman et al.

(10) Patent No.: US 7,319,299 B2
(45) Date of Patent: Jan. 15, 2008

(54) DETERMINING TYPES OF COOLING FANS USED IN A PERSONAL COMPUTER THEREBY USING OPTIMUM PARAMETERS TO CONTROL EACH UNIQUE COOLING FAN

(75) Inventors: Joseph Wayne Freeman, Raleigh, NC (US); Steven Dale Goodman, Raleigh, NC (US); Isaac Karpel, Cary, NC (US); Randall Scott Springfield, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 29 days.

(21) Appl. No.: 11/167,751

(22) Filed: Jun. 27, 2005

(65) Prior Publication Data

US 2006/0291160 A1   Dec. 28, 2006

(51) Int. Cl.
   *H02P 5/00*   (2006.01)
(52) U.S. Cl. .................. 318/66; 318/254; 318/439; 318/503
(58) Field of Classification Search ..................... None
See application file for complete search history.

(56) References Cited

U.S. PATENT DOCUMENTS

| | | | |
|---|---|---|---|
| 4,553,075 A * | 11/1985 | Brown et al. ............... | 318/254 |
| 4,554,491 A * | 11/1985 | Plunkett ..................... | 318/254 |
| 5,075,606 A * | 12/1991 | Lipman ...................... | 318/254 |
| 5,249,741 A | 10/1993 | Bistline et al. ............ | 236/49.3 |
| 6,194,798 B1 * | 2/2001 | Lopatinsky ................. | 310/63 |
| 6,198,184 B1 * | 3/2001 | Ohi et al. .................. | 310/68 C |
| 6,278,248 B1 * | 8/2001 | Hong et al. ................. | 318/254 |
| 6,392,372 B1 | 5/2002 | Mays, II ..................... | 318/254 |
| 6,414,843 B1 | 7/2002 | Takeda ....................... | 361/687 |
| 6,545,438 B1 | 4/2003 | Mays, II ..................... | 318/254 |
| 6,606,578 B1 * | 8/2003 | Henderson et al. ......... | 702/145 |
| 2002/0088615 A1 * | 7/2002 | Dixon et al. ................ | 165/287 |
| 2006/0142901 A1 * | 6/2006 | Frankel et al. ............. | 700/300 |

* cited by examiner

*Primary Examiner*—Lincoln Donovan
*Assistant Examiner*—Renata McCloud
(74) *Attorney, Agent, or Firm*—Winstead PC

(57) ABSTRACT

A cooling fan, system and method for controlling cooling fans in a personal computer. A unique series of sensing points is placed on a rotating hub of a cooling fan in order to uniquely identify the particular type of cooling fan. A tachometer sensor mounted in the cooling fan detects the unique series of sensing points as the cooling fan rotates and generates a sequence of pulses corresponding to the detected sending points. This generated pulse signal may be transmitted by the sensor to the fan control code. The fan control code may determine a particular type of cooling fan that the cooling fan is based on the generated pulse signal. Once the fan control code determines the particular type of cooling fan that the cooling fan is, the fan control code uses particular control parameters set for that particular type of cooling fan to control the cooling fan so that it operates optimally.

6 Claims, 5 Drawing Sheets

DETERMINING TYPES OF COOLING FANS USED IN A PERSONAL COMPUTER THEREBY USING OPTIMUM PARAMETERS TO CONTROL EACH UNIQUE COOLING FAN

TECHNICAL FIELD

The present invention relates to the field of controlling cooling fans in a computer system, and more particularly to determining the types of cooling fans used in a personal computer thereby using optimum parameters to control each unique cooling fan.

BACKGROUND INFORMATION

Generally, a computer system includes a board with various Large Scale Integration (LSI) chips such as a processor mounted thereon, a storage device such as a hard disk, a battery device, and input/output devices, each of which is known to generate heat as each operates in a computer. For some electrical components, such as a processor, a temperature range is often indicated by specifications which set a temperature range indicative of satisfactory and/or optimum performance (hereinafter, as used herein, this temperature and range may also be referred to as "rated temperature"), and often one or more cooling fans are typically provided in conjunction with electrical components in a computer system to keep the temperature in the system within the rated temperature.

A computer system may include multiple processors or electrical components that each need to be cooled by a different cooling fan. The speed of each of these cooling fans may be controlled by a program embedded in the system Basic Input/Output System (BIOS) code in a mode, referred to as the "fan control mode". Typically, the speed of each of these fans is controlled by pulsing a supply voltage to the fan. The pulse supplied to the fans may vary based on the width, amplitude and frequency of the pulse. These characteristics (width, amplitude and frequency) may all be used to control the speed of the cooling fan.

Cooling fans may be manufactured from different manufacturers and may include different designs that each has specific supply voltage characteristic requirements for optimum performance.

However, the BIOS fan control mode has to work with a variety of cooling fans so that the parameters or characteristics it uses to control the fan supply voltage for all these cooling fans are supported. In order to control fan supply voltage for various cooling fans, the parameters or characteristics it uses are not optimum for any of the cooling fans. By not using the optimum parameters or supply voltage characteristics for any of the cooling fans, the cooling fans may be running faster than necessary or operating for a longer duration than necessary or using more power than necessary. Furthermore, the cooling fans may be operating with a greater amount of noise than necessary by not using the optimum parameters.

If, however, each particular cooling fan in the computer system could be operated using the optimum parameters for that cooling fan, then the cooling fans may be operating more efficiently thereby saving power. Furthermore, the cooling fans may be operating more quietly.

Therefore, there is a need in the art to operate each unique cooling fan in the computer system by using its own optimum parameters or characteristics.

SUMMARY

The problems outlined above may at least in part be solved in some embodiments by placing a unique series of sensing points (e.g., magnets, foil, notches, bumps) on a rotating hub of the cooling fan in order to uniquely identify the particular type of cooling fan. A tachometer sensor mounted in the cooling fan detects the unique series of sensing points as the cooling fan rotates and generates a sequence of pulses corresponding to the detected sending points. This generated pulse signal may be transmitted by the sensor to a processor. The processor, in response to the fan control code, determines a particular type of cooling fan that the cooling fan is based on the generated pulse signal. Once the processor determines the particular type of cooling fan that the cooling fan is, the processor, in response to the fan control code, uses particular control parameters set for that particular type of cooling fan to control the cooling fan so that it operates optimally.

In one embodiment of the present invention, a method for controlling cooling fans in a personal computer may comprise the step of placing a unique series of sensing points on a fan hub of a cooling fan in a fan housing. The method may further comprise detecting a passing of the sensing points as the cooling fan rotates. The method may further comprise generating a sequence of pulses corresponding to the detected sending points. The method may further comprise using particular control parameters to control the cooling fan based on the determined type of fan.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a cooling fan, system and method for controlling cooling fans in a personal computer. In one embodiment of the present invention, a unique series of sensing points (e.g., magnets, foil, notches, bumps) is placed on a rotating hub of a cooling fan in order to uniquely identify the particular type of cooling fan. A tachometer sensor mounted in the cooling fan detects the unique series of sensing points as the cooling fan rotates and generates a sequence of pulses corresponding to the detected sending points. This generated pulse signal may be transmitted by the sensor to a processor. The processor, in response to the fan control code, determines a particular type of cooling fan that the cooling fan is based on the generated pulse signal. Once the processor determines the particular type of cooling fan that the cooling fan is, the processor, in response to the fan control code, uses particular control parameters set for that particular type of cooling fan to control the cooling fan so that it operates optimally.

It is noted that even though the following discusses controlling cooling fans for processor that the principles of the present invention may be applied to controlling cooling fans for other electrical components in a computer system. It is further noted that a person of ordinary skill in the art would be capable of applying the principles of the present invention to controlling cooling fans for other electrical components in a computer system. It is further noted that embodiments for controlling cooling fans for other electrical components in a computer system would fall within the scope of the present invention.

It is further noted that even though the following discusses controlling cooling fans in a computer system that the principles of the present invention may be applied to any type of rotational machinery. It is further noted that a person of ordinary skill in the art would be capable of applying the principles of the present invention to such applications and that embodiments covering such applications would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
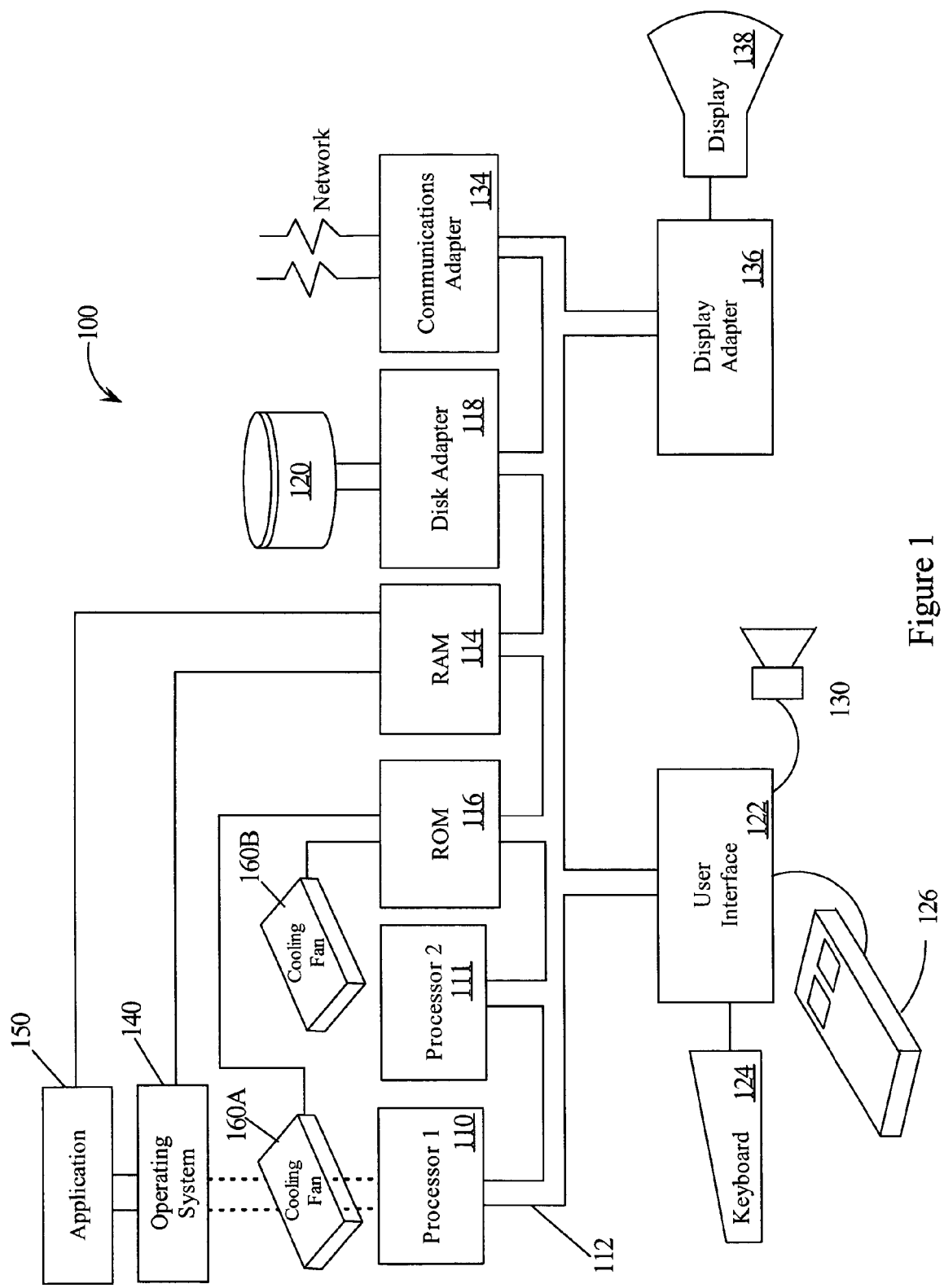
FIG. 1 illustrates a computer system in accordance with an embodiment of the present invention.

FIG. 1—Computer System

FIG. 1 illustrates a hardware configuration of computer system 100 which is illustrative of a hardware environment for practicing the present invention. Computer system 100 may have a first processing unit 110 and a second processing unit 111 coupled to various other components by system bus 112. An operating system 140 may run on first processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. In one embodiment, the BIOS may include code, referred to herein as the "fan control code", configured to control cooling fans separately using optimal parameters or characteristics for that particular cooling fan as described in further detail below in association with FIGS. 2-5. In another embodiment of the present invention, the fan control code may reside in operating system 140.

Random access memory (RAM) 114 and disk adapter 118 may also be coupled to system bus 112. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., a disk drive.

Computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 and speaker 130.

Computer system 100 may further include cooling fans 160A-B configured to cool processors 110, 111, respectively. Cooling fans 160A-B may collectively or individually be referred to as cooling fans 160 or cooling fan 160, respectively. Cooling fan 160 may be coupled to ROM 116 thereby allowing the fan control code (in the embodiment where the fan control code resides in the BIOS) to control the speed and operation of cooling fan 160. In another embodiment, control fan 160 may be coupled to RAM 114 thereby allowing the fan control code (in the embodiment where the fan control code resides in the operating system) to control the speed and operation of cooling fan 160. The fan control code may control the speed and operation of cooling fans 160 by pulsing a supply voltage to cooling fans 160. The pulse supplied to cooling fans 160 may vary based on the width, amplitude and frequency of the pulse. These characteristics (width, amplitude and frequency) or control parameters may all be used to control the speed of cooling fans 160 such as by controlling an amount of voltage supplied to each cooling fan 160. A more detail description of cooling fan 160 is provided below in association with FIG. 2.

It is noted that computer system 100 may include any number of processors or electrical components that require cooling fans and that FIG. 1 is illustrative.

As stated in the Background Information section, the BIOS fan control mode has to work with a variety of cooling fans so that the parameters or characteristics it uses to control the fan supply voltage for all these cooling fans are supported. In order to control fan supply voltage for various cooling fans, the parameters or characteristics it uses are not optimum for any of the cooling fans. By not using the optimum parameters or supply voltage characteristics for any of the cooling fans, the cooling fans may be running faster than necessary or operating for a longer duration than necessary or using more power than necessary. Furthermore, the cooling fans may be operating with a greater amount of noise than necessary by not using the optimum parameters. If, however, each particular cooling fan in the computer system could be operated using the optimum parameters for that cooling fan, then the cooling fans may be operating more efficiently thereby saving power. Furthermore, the cooling fans may be operating more quietly. Therefore, there is a need in the art to operate each unique cooling fan in the computer system by using its own optimum parameters or characteristics. Computer system 100 is able to operate each cooling fan 160 in system 100 by using its own optimum parameters or characteristics by including sensing points on the rotating hubs of cooling fans 160 as described below in association with FIG. 2.

FIG. 2—Cooling Fan

Figure 2:
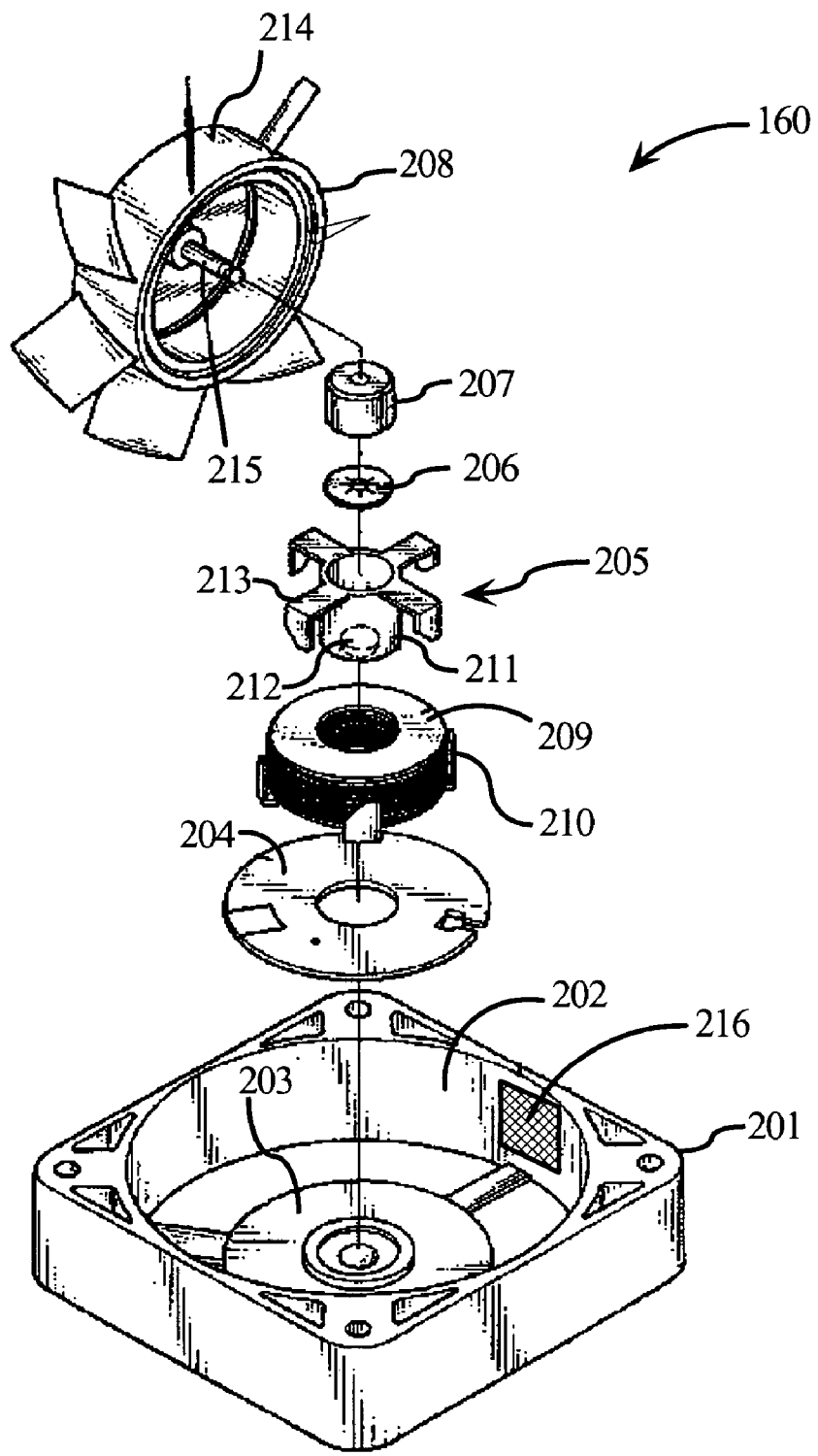
FIG. 2 illustrates a cooling fan in a computer system in accordance with an embodiment of the present invention.

FIG. 2 illustrates an embodiment of the present invention of cooling fan 160 (FIG. 1). Referring to FIG. 2, cooling fan 160 may include a housing 201 with a circular recess 202 defined therein and a seat 203 formed at a bottom face thereof. A circuit board 204, a stator assembly 205, a collar 206, a self-lubricating bearing 207 and a rotor 208 are in turn coaxially mounted in recess 202 of housing 201.

Referring to FIG. 2, circuit board 204 is secured on seat 203 of housing 201. Stator assembly 205 has a coil 209 with an opening (not shown) and is fixedly mounted on circuit board 204 by a bracket 210 provided beneath coil 209. A sleeve 211, of which a first end is enclosed, is received in the opening of coil 209. Sleeve 211 has an external dome 212 formed at the first end thereof. A fastener 213 composed of a plurality of wings (not shown) is integrally formed with a second end of sleeve 211, wherein the wings each comprise a laterally extended arm (not shown) and a finger (not shown) perpendicularly extended from a distal edge of the arm and toward the first end of sleeve 211. The arms of the wings are engaged with a top face of coil 209 and the fingers of the wings are engaged with an outer circumference of coil 209 to fasten sleeve 211 on coil 209.

Collar 206 defines an aperture (not shown) and is provided on a bottom face of sleeve 211. The self-lubricating bearing 207 is received and secured in sleeve 211 and placed upon collar 206.

Rotor 208 may have placed a series of sensing points (e.g., magnets, foil, notches, bumps) on rotating hub 214. Each cooling fan 160 may include a different series of sensing points placed on rotating hub 214 thereby allowing different cooling fans 160 to be identified as explained in further detail below.

Figure 3:
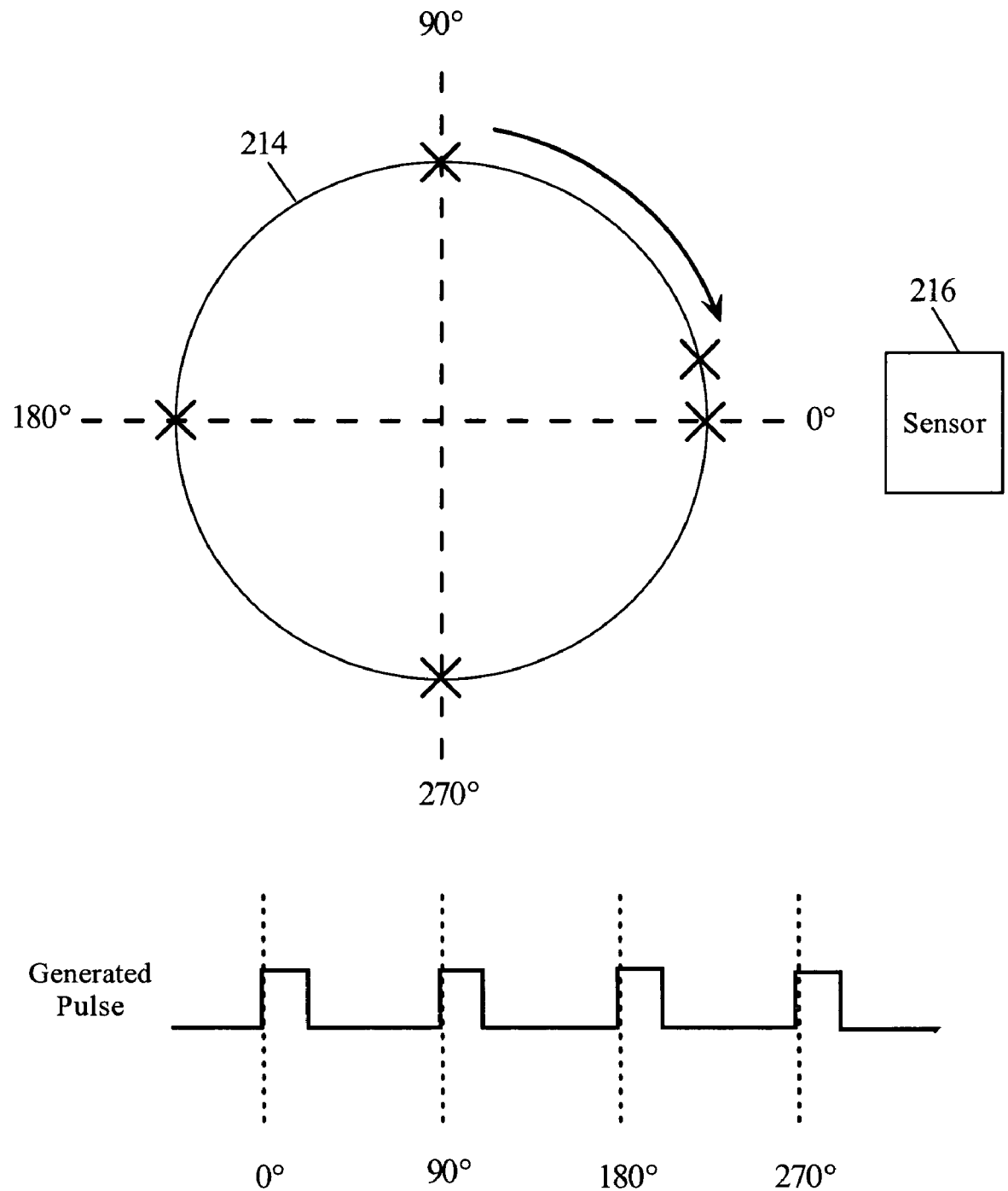
FIG. 3 illustrates identifying a particular cooling fan by placing sensing points at strategic locations on a rotating hub of the cooling fan in accordance with an embodiment of the present invention.
Figure 4:
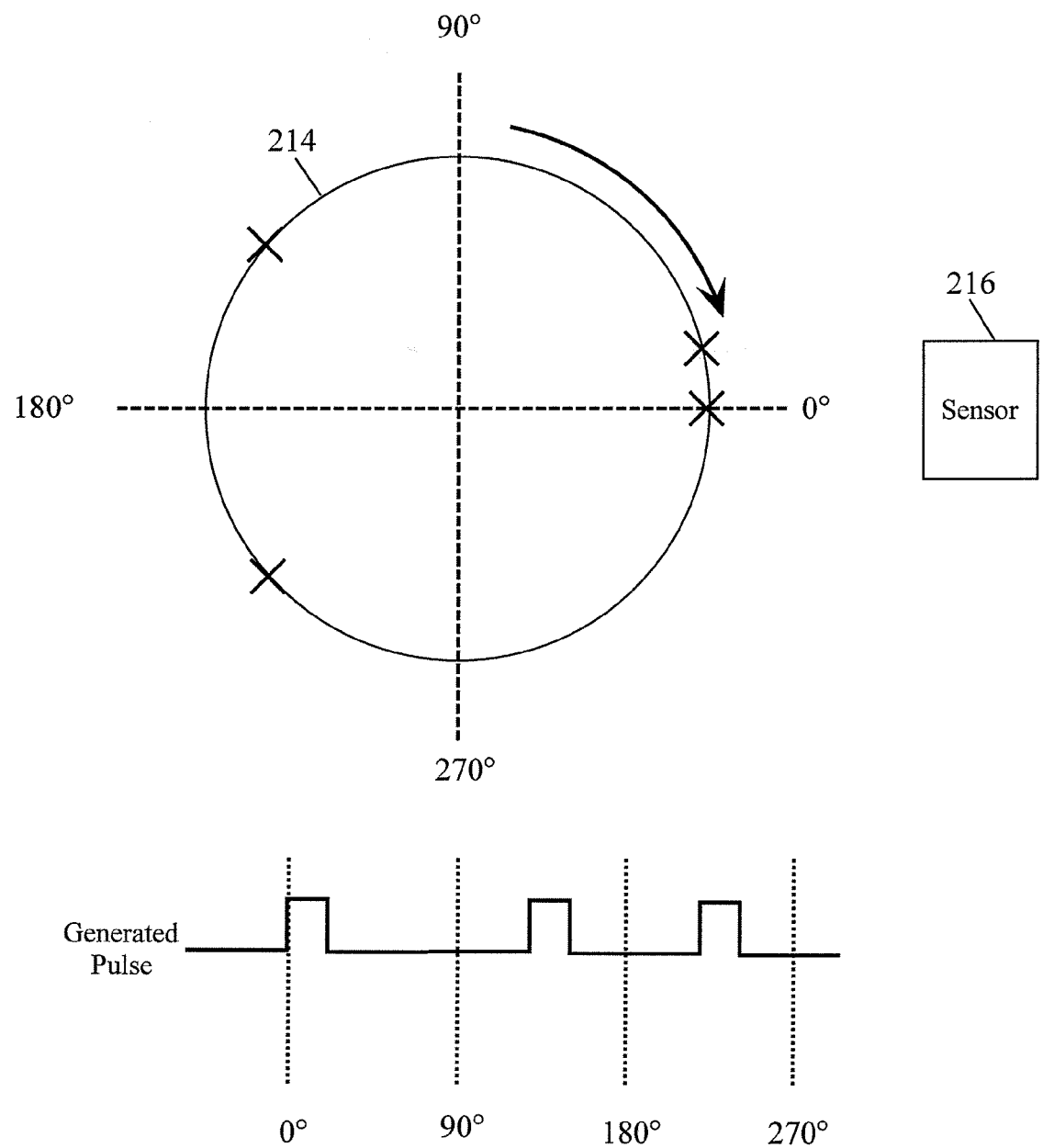
FIG. 4 illustrates identifying a different cooling fan by placing sensing points at different strategic locations on a rotating hub of the cooling fan in accordance with an embodiment of the present invention.

For example, referring to FIGS. 3 and 4 in conjunction with FIG. 2, FIGS. 3 and 4 illustrate sensing points (indicated by "x") being placed at different strategic locations on rotating hub 214 for different cooling fans 160. Referring to FIG. 3, cooling fan 160 represented in FIG. 3 may be uniquely identified by placing a pair of closely spaced sensing points at 0 degrees (x and y axis are drawn through the center of rotor 208 to illustrate the location of sensing points in degrees) as well as a sensing point placed at 90 degrees, 180 degrees and at 270 degrees. This unique pattern of sensing points may cause sensor 216 (described in further detail below) to generate the pulse indicated at the bottom of FIG. 3. As illustrated in FIG. 3, sensor 216 may generate an asserted signal each time a sensing point is detected as cooling fan 160 rotates (as indicated by the arrow in FIG. 3) thereby generating a unique pulse corresponding to a unique pattern of sensing points used to identify a particular type of cooling fan 160. For example, sensor 216 generates a pulse that is asserts at 0 degrees (a little bit longer than at the other locations that sensing points are detected since there are closely spaced sensing points that are located at 0 degrees), 90 degrees, 180 degrees and at 270 degrees.

Referring to FIG. 4, cooling fan 160 represented in FIG. 4 may be uniquely identified by placing a pair of closely spaced sensing points at 0 degrees (x and y axis are drawn through the center of rotor 208 to illustrate the location of sensing points in degrees) as well as a sensing point placed at 135 degrees and at 235 degrees. This unique pattern of sensing points may cause sensor 216 (described in further detail below) to generate the pulse indicated at the bottom of FIG. 4. As illustrated in FIG. 4, sensor 216 may generate an asserted signal each time a sensing point is detected as cooling fan 160 rotates (as indicated by the arrow in FIG. 4) thereby generating a unique pulse corresponding to a unique pattern of sensing points used to identify a particular type of cooling fan 160. For example, sensor 216 generates a pulse that is asserts at 0 degrees (a little bit longer than at the other locations that sensing points are detected since there are closely spaced sensing points that are located at 0 degrees), 135 degrees and at 235 degrees.

Returning to FIG. 2, rotor 208 may further include a core 215 formed at the center thereof. Core 215 has a head formed at a distal end thereof. Core 215 is secured in self-lubricating bearing 207 and the head of core 215 is inserted through collar 206 and received in dome 212.

Cooling fan 160 may further include a tachometer sensor 216 placed at a fixed location in fan housing 201. For example, tachometer sensor 216 may be placed on the inner rim of recess 202. Sensor 216 may be configured to detect the passing of the sensing points placed on rotating hub 214 as cooling fan 160 rotates as discussed above. Sensor 216 may further be configured to generate a sequence of pulses corresponding to the detected sending points as illustrated in FIGS. 3-4. This generated pulse signal may be transmitted by sensor 216 to processor 110, 111. Processor 110, 111, in response to the fan control code located in either ROM 116 or operating system 140, may determine a particular type of cooling fan that cooling fan 160 is based on the generated pulse signal. Once processor 110, 111 determines the particular type of cooling fan that cooling fan 160 is, processor 110, 111, in response to the fan control code, uses particular control parameters set for that particular type of cooling fan to control cooling fan 160 so that it operates optimally.

It is noted that cooling fan 160 may include different elements than presented herein and that FIG. 2 is illustrative of a sample embodiment of cooling fan 160. It is further noted that the present invention is not to be limited in scope to any particular embodiment, including the embodiment discussed herein, but rather is to include the principles discussed herein.

A method for controlling cooling fans 160, using the principles described above in association with FIGS. 1-4, is provided below in association with FIG. 5.

Figure 5:
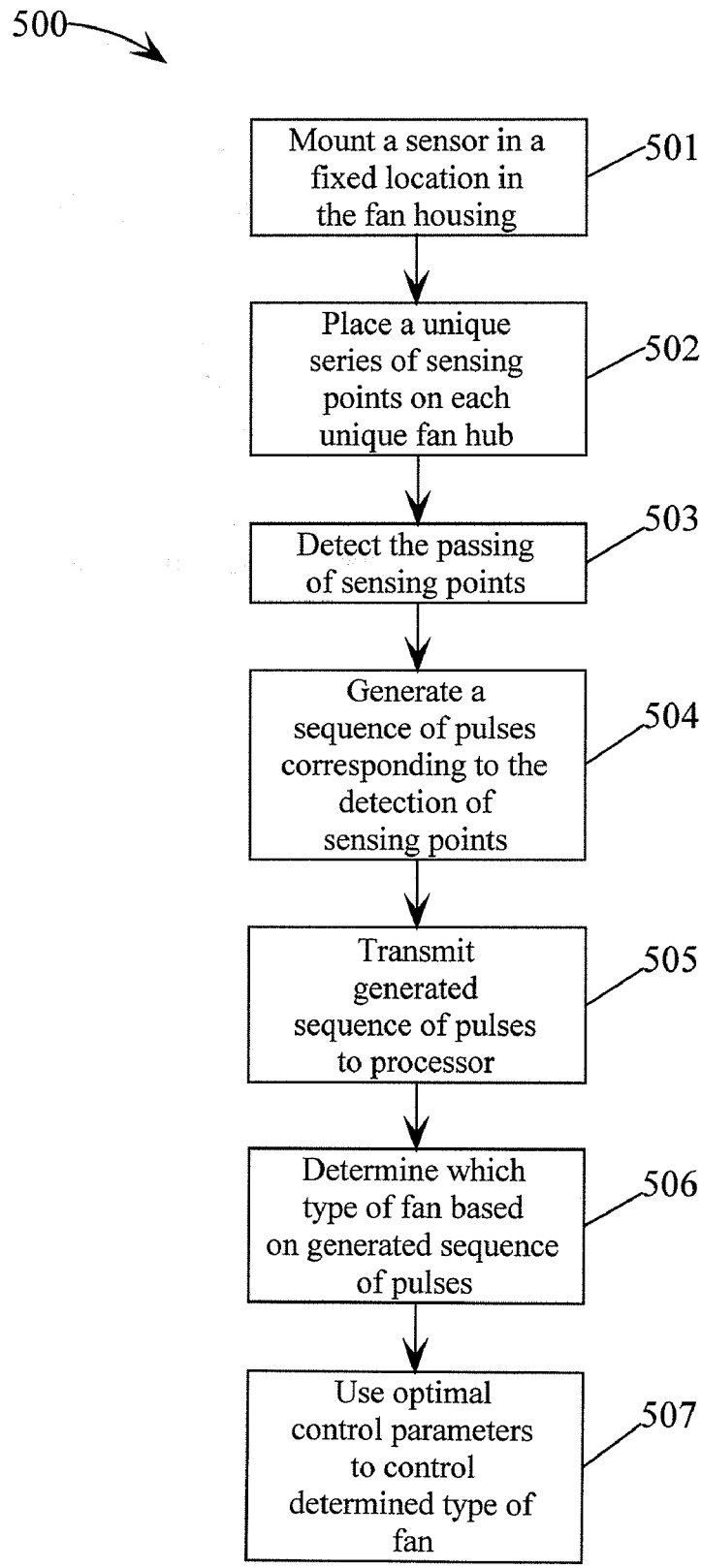
FIG. 5 is a flowchart of a method for controlling cooling fans by using its own optimum parameters or characteristics in accordance with an embodiment of the present invention.

FIG. 5—Method for Controlling Cooling Fans in a Personal Computer

FIG. 5 is a flowchart of one embodiment of the present invention of a method 500 for controlling cooling fans 160 (FIG. 1) by using its own optimum parameters or characteristics.

Referring to FIG. 5, in conjunction with FIGS. 1-4, in step 501, tachometer sensor 216 is mounted in a fixed location in fan housing 201. For example, tachometer sensor 216 may be placed on the inner rim of recess 202.

In step 502, a unique series of sensing points, as discussed above, is placed on fan hub 214 at various locations to uniquely identify a type of cooling fan.

In step 503, tachometer sensor 216 detects the passing of sensing points as cooling fan 160 rotates. In step 504, tachometer sensor 216 generates a sequence of pulses corresponding to the detection of sensing points. In step 505, tachometer sensor 216 transmits the generated sequence of pulses to processor 110, 111.

In step 507, processor 110, 111, in response to the fan control code, determines which type of fan cooling fan 160 is based on the generated sequence of pulses. Once processor 110, 111 determines the particular type of cooling fan that cooling fan 160 is, processor 110,111, in response to the fan control code, in step 508, uses particular control parameters set for that particular type of cooling fan to control cooling fan 160 so that it operates optimally.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner.

Although the method, system and cooling fan are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A system, comprising:
   a processor,
   a memory unit, wherein said memory unit stores fan control code;
   a bus coupling said processor to said memory unit; and
   a cooling fan coupled to said processor and to said memory unit, wherein said cooling fan comprises:
   a housing with a recess defined therein;
   a seat forming a bottom face of said housing;
   a rotor coaxially mounted in said recess of said housing, wherein a unique series of sensing points are located on a rotating hub of said rotor; and
   a sensor located in a fixed location in said fan housing, wherein said sensor is configured to detect a passing of said sensing points as said cooling fan rotates, wherein said sensor is further configured to generate a sequence of pulses corresponding to said detected sending points;
   wherein said processor, in response to said fan control code, determines a type of fan said cooling fan is based on said generated sequence of pulses, wherein said processor, in response to said fan control code, uses particular control parameters to control said cooling fan based on said determined type of fan.

2. The system as recited in claim 1, wherein said sensor is configured to transmit said generated sequence of pulses to said processor.

3. The method as recited in claim 1, wherein said control parameters are used to control an amount of voltage supplied to said cooling fan.

4. A cooling fan, comprising:
   a housing with a recess defined therein;
   a seat forming a bottom face of said housing;
   a rotor coaxially mounted in said recess of said housing, wherein a unique series of sensing points are located on a rotating hub of said rotor; and
   a sensor located in a fixed location in said fan housing, wherein said sensor is configured to detect a passing of said sensing points as said cooling fan rotates, wherein said sensor is further configured to generate a sequence of pulses corresponding to said detected sending points;
   wherein a processor, in response to a fan control code, determines a type of fan said cooling fan is based on said generated sequence of pulses, wherein said processor, in response to said fan control code, uses particular control parameters to control said cooling fan based on said determined type of fan.

5. The cooling fan as recited in claim 3, wherein said sensor is configured to transmit said generated sequence of pulses to said processor.

6. The cooling fan as recited in claim 3, wherein said control parameters are used to control an amount of voltage supplied to said cooling fan.

* * * * *